United States Patent Office 3,442,864
Patented May 6, 1969

3,442,864
FORMALS OF NORBORNANE-2,7-DIOLS AND COPOLYMERS THEREOF WITH TRIOXANE
Thomas A. Magee, Mentor, Ohio, assignor to Diamond Alkali Company, Cleveland, Ohio, a corporation of Delaware
No Drawing. Filed June 30, 1965, Ser. No. 468,637
Int. Cl. C08g 1/10, 1/04
U.S. Cl. 260—67
21 Claims

ABSTRACT OF THE DISCLOSURE

A monomeric cyclic formal of either unsubstituted norbornane-2,7-diol or of an alkyl or alkoxy-substituted derivative thereof is obtained by reacting the said norbornane-2,7-diol with trioxymethylene in the presence of a suitable water-azeotroping solvent and employing as the condensation catalyst, a mineral acid or an organic mineral acid. The cyclic formal product is then copolymerized with trioxane to produce an oxymethylene copolymer having a high degree of thermal stability.

This invention relates to new compositions of matter, their method of preparation and copolymers thereof which are structurally related to polyoxymethylene. More particularly, this invention relates to novel cyclic formals of certain norborane-2,7-diols which may be copolymerized with trioxane to form useful high melting copolymers having a high degree of thermal stability.

Oxymethylene polymers, having recurring —CH$_2$O— units have been known for many years. They may be prepared by the polymerization of anhydrous formaldehyde, by polymerization of trioxane, a cyclic trimer of formaldehyde, or by polymerizing other oligomers of formaldehyde. These polymers are thermoplastic materials of varying molecular weight which, by reason of thermally unstable hydroxyl groups terminating the polymer chains, will be degraded or decomposed in varying degrees when they are exposed to elevated processing temperatures. Accordingly, recent activity has been directed to achieving suitable oxymethylene copolymers that have incorporated into the polymer chains thermally stable units and thus may be fabricated at elevated temperatures without first being stabilized as by chemical treatment or by incorporating stabilizing additives therewith. For instance, as shown in copending application Ser. No. 449,271, filed Apr. 19, 1965, an easily workable, thermally stable oxymethylene copolymer composition has been obtained by copolymerizing a monomeric mixture of trioxane and norbornadiene. This copolymer product is a solid, medium to high molecular weight material that exhibits, as prepared, an inherent high degree of thermal stability, being not subject to substantial weight reduction (decomposition) when exposed to relatively high temperatures.

It has now been found that novel cyclic formals of certain norbornane-2,7-diols (like norbornadiene, members of the class of norbicyclic compounds) may be employed as comonomers with trioxane to prepare copolymer products having, as prepared, markedly improved thermal stability by comparison to similarly prepared oxymethylene homopolymers. These copolymers are solid, medium to high molecular weight materials which are easily processed into a variety of useful plastic articles such as films, moldings, rods, tubes and the like. They exhibit inherently a high degree of thermal stability, not being subject to substantial weight reduction, i.e., decomposition or degradation, when exposed to temperatures of at least 200° C. or above. Thus, the copolymers of this invention may be fabricated at required elevated processing temperatures without first being stabilized as by chain end group "capping," i.e., by chemically converting unstable hydroxyl groups to more stable ester or ether groups and/or by incorporating therewith stabilizing additives such as used heretofore to inhibit thermal degradation of oxymethylene homopolymers to some degree.

The novel cyclic formals of certain norbornane-2,7-diols which are suitably copolymerized with trioxane in the process of this invention may be represented by the following structural formula:

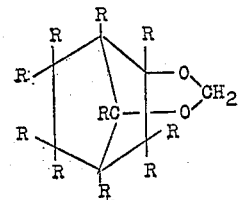

wherein each R is selected from the group consisting of hydrogen, lower alkyl and lower alkoxy radicals containing up to 4 carbon atoms with the proviso that a maximum of three R's are alkyl or alkoxy radicals. These compounds are prepared from norbornane-2,7-diol intermediates which include unsubstituted norborane-2,7-diol and the alkyl-substituted derivatives thereof having a maximum of three lower alkyl or alkoxy groups attached to the norbornane ring. Of this class of formal compounds, particularly suitable for use are the formals of unsubstituted norbornane-2,7-diol and derivatives thereof having substituents in the 5- and 6-positions of the ring, e.g., 5-methyl or 6-methyl norbornane-2,7-diol, with the formal of unsubstituted norbornane-2,7-diol being especially preferred at present. For this reason, therefore, and also for purposes of convenience and simplication in the detailed description of the invention, specific reference will be made hereinafter to the formal of unsubstituted norbornane-2,7-diol. Such reference is not to be taken, however, as limiting the scope of the invention but merely as being illustrative thereof.

The novel cyclic formals used herein as comonomers with trioxane may be conveniently prepared by reacting a norbornane-2,7-diol as described above with trioxymethylene in the presence of a suitable water-azeotroping solvent and employing a catalyst such as p-toluenesulfonic acid monohydrate, sulfuric acid or the like. In the preparation of the preferred cyclic formal comonomer of this invention, the necessary intermediate norbornane-2,7-diol may be prepared according to the procedure as set forth in J. Am. Chem. Soc., vol. 76 (1954), pages 5,400 to 5,403, particularly by the procedure as described on page 5,402. This procedure is more fully described in Example 1 hereinafter but briefly involves the oxidation of bycyclo-[2.2.1]-heptene (which is commonly designated as norbornene) by performic acid which produces 2-formyloxynorbornane-7-ol, i.e., the monoformic acid ester of norbornane-2,7-diol. This compound is then hydrolyzed by saponification with sodium hydroxide to form the dihydric alcohol (diol) of norbornane, which is then extracted and purified.

In accordance with the following equation, the norbornane-2,7-diol (I) thus formed is reacted with trioxymethylene in a suitable water-azeotroping solvent and in the presence of, e.g., p-toluenesulfonic acid or sulfuric acids as catalyst to prepare the novel cyclic formal (II) of this invention.

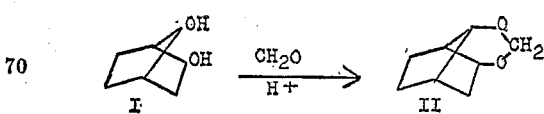

The diol and trioxymethylene reactants are preferably reacted slowly and additional heat is usually applied for the necessary gradual distillation of the resulting water azeotrope. The reaction mixture is heated for about 3 hours to insure completion of the reaction. For best compound yields, subsequent storage of the reaction mixture for 10–20 hours is usually desirable. After storage, heating of the reaction mixture is resumed with the solvent being continuously replaced as it is distilled so that the total volume of the mixture remains essentially the same. After this second reaction period, the solvent is separated from the mixture under reduced pressure and the novel cyclic formal of norbornane-2,7-diol is recovered and further purified by distillation.

Typical of compounds other than p-toluenesulfonic acid or sulfuric acid that may be used advantageously as reaction initiators are other sulfonic acids, other mineral acids, their salts or organic anhydrides, Lewis acids and coordination complexes of Lewis acids with organic compounds wherein preferably oxygen, nitrogen or sulfur is the donor atom.

In general, any inert organic solvent which will azeotropically remove water may be used in preparing the formal. Specific compounds which suitably may be employed include aromatic hydrocarbons such as benzene, toluene or xylene and alipthatic hydrocarbons, particularly chlorinated derivatives such as chloroform, methylene chloride and the like.

To prepare the novel cyclic formals of this invention, reaction temperatures employed range from about 30° to 100° C. and reaction times are from 2 to 6 hours.

The above-described novel formal containing the norborane nucleus does not homopolymerize under ordinary conditions; however, it has been found that when this monomer is mixed with trioxane, copolymerization occurs readily, and useful, easily workable oxymethylene copolymers are obtained.

In general, monomeric mixtures used in the reaction contain from 95 to 99.9 mol percent of trioxane and from 0.1 up to 5 mol percent of the cyclic formal of norbornane-2,7-diol. Preferably, monomeric mixtures are used containing from 98 up to 99.75 mol percent of trioxane and from 0.25 up to 2 mol percent of the said cyclic formal.

While I do not wish to be bound by any definite theory with regard to the manner in which copolymerization of trioxane and the cyclic formal is accomplished, it is believed that the addition of the formal occurs by the rupture of the cyclic acetal linkage thereof with subsequent or simultaneous addition of recurring oxymethylene units. This rupture may occur, of course, on either side of the central methylene group in the formal bridge, essentially the same copolymer product being obtained in either instance.

I further believe that this novel cyclic formal compound acts much like known comonomers in its manner of addition to or combination with trioxane (or any other material containing an activated polyoxymethylene chain) in that it most likely enters into the predominantly linear copolymeric chain in a substantially random manner with a frequency largely dependent upon its concentration in the copolymerization mixture.

The copolymer products of this invention may contain generally from about 0.1 up to 5 mol percent of units derived from the formal of norbornane-2,7-diol. The preferred copolymers contain from about 0.25 up to 2 mol percent of the said recurring units derived from the novel cyclic formal and from about 98 up to 99.75 mol percent of recurring polyoxymethylene units.

The composition of the copolymer products of this invention is determined herein by elemental carbon and hydrogen analysis. The percentages of these elements are higher in the copolymers than in an oxymethylene homopolymer prepared under similar conditions. Therefore, employing the different carbon and hydrogen analyses obtained for the copolymers and for the homopolymer and by a series of calculations, the number of units derived from the novel cyclic formal monomer recurring in the copolymer chain, i.e., the mol percentage of these units, is obtained.

Depending upon the percentage of the cyclic formal of norbornane-2,7-diol present in the copolymer products, these materials have melting points somewhat lower than or approximately the same as oxymethylene homopolymers, i.e., these copolymers have melting points within the range of about 160° to 185° C. In appearance, the copolymers resemble polyoxymethylene and those having similar melting points likewise exhibit similar properties.

The copolymer products of this invention have average polymer molecular weight ranging from 6,000 to 70,000. In order to produce finished plastic articles having useful property levels, these copolymers usually will have an inherent viscosity of at least 0.7 which value is determined by measuring at 60° C., the viscosity of a solution containing 0.5 g. of the copolymer per 100 milliliters of solution, the solvent being p-chlorophenol containing 2 percent alpha-pinene, by weight. An inherent viscosity of 0.7 corresponds to an average molecular weight of approximately 10,000. Copolymers from which products having the most useful property levels are prepared have usually an inherent viscosity of at least 1.0 which value corresponds to an average polymer molecular weight of about 17,000.

The copolymerization reaction is effected in the presence of a cationically-active polymerization catalyst. Suitable catalysts of this type include Lewis acids, e.g., metal halides such as the halides of aluminum, boron, tin, titanium, zirconium, strontium, niobium and the like, and coordination complexes of such metal halides with organic compounds where oxygen, nitrogen or sulfur is the donor atom. In practice, the coordination complexes are most suitably employed, with such complexes of boron trifluoride being especially preferred. Suitable boron trifluoride complexes may be, for example, a complex of boron trifluoride with an alcohol, a phenol, an acid, an ether, an acid anhydride, an ester, a ketone, an aldehyde, a dialkyl sulfide, a mercaptan and the like. Of these types, the boron trifluoride complexes with ethers such as diethyl ether, dibutyl ether, etc., are especially preferred. In general, the particular catalyst employed in the process of this invention may be used in amounts ranging from 0.01 to about 5.0 millimols for each mol of trioxane employed. However, an amount of catalyst within the range of about 0.03 to about 0.5 millimol per mol of trioxane is generally satisfactory and is preferred.

The copolymer products of this invention may be conveniently prepared in good yield (60% to 95% conversion) by contacting the trioxane and the cyclic formal of norbornane-2,7-diol monomer in the fluid state with a catalyst in the absence of a solvent or other liquid medium. Alternatively, polymerization may be conducted in an anhydrous organic liquid in which the trioxane and the novel formal are suspended. Liquids preferably employed are aliphatic hydrocarbons, e.g., hexane, heptane, cyclohexane and the like. In most instances, the polymer product formed is essentially insoluble in the liquid used in the reaction and may be recovered easily therefrom by filtration. The liquid is employed generally in a ratio of about 0.1 to 5 mols for each mol of trioxane. However, a concentration of 0.1 to 0.3 mol of liquid for each mol of trioxane usually has been found satisfactory and is preferred.

The copolymerization reaction, whether conducted in bulk or in a solvent medium as described above, generally is carried out at temperatures within the range of 30° C. to 100° C. for a time period of from 1 hour to 20 hours. However, reaction temperatures within the range of 30° to 70° C. and reaction times of 1 to 5 hours are preferably employed.

It has been found that trace contaminants such as water in the reaction mixture substantially inhibit monomer conversion to the desired copolymers in good practical yields. It is therefore essential that the copolymerization process be conducted under anhydrous, or substantially anhydrous, conditions. For most satisfactory products, it has been established that the reaction ingredients, i.e., the monomer, or the monomers and solvent in combination should contain no more than 100 p.p.m., preferably no more than 50 p.p.m. of water. Likewise, impurities in the monomers should be removed as completely as possible. In practice, the catalyst employed is prepared and then kept prior to use in a nitrogen atmosphere. The monomeric materials are advantageously dried prior to copolymerization by careful distillation over a dehydrating agent such as sodium and/or by dehydration processes using absorbents such as molecular sieves, silica gel, etc. When employed, the liquid reaction medium may be dehydrated by standard distillation and drying methods.

Upon completion of the reaction, the copolymerization mixture is filtered to recover the product precipitate. Before being dried, the product is usually purified by leaching with methanol, with hot water, and again with methanol, to remove any unreacted monomer and lower molecular weight homopolymers remaining. Additionally, the copolymer product may be heated briefly at a temperature of 100° to 160° C. to decompose any loose unstable chain ends.

As shown hereinafter by specific examples, the copolymers of this invention possess inherently a high degree of thermal stability. As designated herein, the thermal stability of the copolymers of this invention is the value representing the constant rate at which these materials degrade or decompose at an elevated temperature at which degradation can be easily and accurately measured. This value, i.e., the reaction rate constant for thermal degradation, is measured herein in an inert atmosphere by well known thermogravimetric analytical techniques, using a Stanton Automatic Recording Thermobalance, High Temperature Model. Throughout the test, the copolymer is maintained at a temperature of 220° C., the decomposition of the copolymer, as measured by loss in weight and the time of the test, in minutes, being automatically recorded. After the heat treatment, the decomposition rate of the copolymer is obtained by plotting, as the ordinate, the logarithm of the weight percent of the remaining undegraded copolymer versus the corresponding time of even exposure. A curve drawn through the plotted values indicates that, after rather rapid degradation initially, the copolymer degrades at a much slower, even rate throughout the major portion of the degradation period, which slower rate characterizes the stable nature of the copolymer. The reaction rate constant value is selected from this latter portion of the degradation curve and is expressed by weight percent per minute. The copolymers of this invention exhibit generally a reaction rate constant for thermal degradation at 220° C. of 0.2 weight percent per minute, or less, with the preferred copolymers exhibiting reaction rate constants of 0.06 weight percent per minute or less. It is thus possible to process the copolymers of this invention as prepared without any further thermal stabilization such as by chemical treatment and/or by the use of stabilizing additives therewith. However, it is to be understood that these copolymers may be so treated, if desired, without departing from the intended scope of this invention.

The copolymer products of this invention may be used to prepare articles such as moldings, films, sheets, rods, tubes, fibers, filaments and the like by conventional molding, casting and/or extrusion processes such as are being presently practiced. The finished articles exhibit generally excellent physical and chemical properties typical of articles fabricated from oxymethylene homopolymers. In processing, the copolymer products of this invention may be used unmodified or, if desired, may have incorporated therewith additives such as antioxidants, fillers, pigments, stabilizers, processing aids and the like which are oftentimes employed when processing such thermoplastic materials.

In order to illustrate the present invention, the following examples are given by way of illustration in order that this invention may be more fully understood.

EXAMPLE 1

Preparation of norbornane-2,7-diol

Norbornane-2,7-diol which is used to prepare the novel cyclic formal is prepared according to the procedure described in J. Am. Cem. Soc., vol. 76 (1954), page 5,402, as follows: A two-liter, three-necked, round-bottom flask equipped with a mechanical stirrer and thermometer is charged with 562 ml. of formic acid, 77 ml. of distilled water and 150 ml. of 30 percent hydrogen peroxide. To the stirred solution is added 100 g. (1.06 mol) of norbornene slowly, over a two-hour period, so that the reaction temperature does not exceed 45° C. Thereafter, the mixture is stirred for another hour at 40° C., and is then stored with agitation at room temperature for 15 hours. The reaction mixture is then heated to 90° C. and is stripped of volatiles at about 2 mm. of mercury pressure. With agitation, the residue is hydrolyzed by adding thereto slowly over a 1½ hour period a solution of 85.2 g. of NaOH in 170 ml. of water at such a rate that the temperature of the reaction mixture does not exceed 45° C. After about 30 minutes of further mixing, the mixture is extracted four times with ethyl acetate. The combined extraction solutions are dried over magnesium sulfate, then filtered and finally stripped of solvent at reduced pressure, yielding 114 g. (83%) of a yellow-tan solid. This solid is sublimed at 100° C. at 1 mm. Hg pressure to give white crystals of norbornane-2,7-diol, melting at 168° to 170° C.

EXAMPLE 2

Preparation of the cyclic formal of norbornane-2,7-diol

A three-necked, round-bottom, one-liter flask equipped with a mechanical agitator, thermometer, dropping funnel and conventional distillation means is charged with 25.6 g. (0.2 mol) of the norbornane-2,7-diol (product of Example 1), 9.0 g. (0.3 mol of $CH_2O$) of trioxymethylene, 500 ml. of benzene and 1 g. of p-toluenesulfonic acid monohydrate as catalyst. The mixture is heated in an oil bath for about three hours at a bath temperature of about 90° to 100° C. with resulting slow azeotropic distillation of the water formed in the reaction. Fresh benzene is added from the dropping funnel to keep the volume nearly constant. After storage of the mixture for about 15 hours, the acid in the mixture is neutralized with concentrated caustic solution, the bulk of the benzene is removed at about 30 mm. Hg pressure and the filtered residue is vacuum distilled. The product is recovered in 50-percent yield (14.0 g.) as a clear, water-white stable liquid, having a boiling point of 79° C. at 8.7 mm. Hg pressure and a refractive index of $n_D{}^{25.5}$ 1.4889. The product is also indicated as the cyclic formal of norbornane-2,7-diol by the following elemental analytical data.

Actual percent by weight: C, 68.5; H, 8.7. Calculated percent by weight: C, 68.53; H, 8.63.

EXAMPLE 3

Preparation of the cyclic formal of norbornane-2,7-diol

A three-necked, round-bottom, one-liter flask equipped with a mechanical stirrer and a 1 inch x 6 inch Vigreux column topped by a reflux-type condenser is charged with 25.6 g. (0.2 mol) of the norbornane-2,7-diol (product of Example 1), 23.1 g. of formalin (0.3 m. $CH_2O$), 400 ml. of benzene and as catalyst, 0.5 g. of sulfuric acid which is added dissolved in 23 ml. of water. The mixture is heated at about 70° C. with stirring for two hours. A Barrett-type water trap is then inserted in the column and the water is separated azeotropically in a time period of about 5½ hours. The acid in the mixture is neutralized by adding a solution containing 0.6 g. of NaOH in two ml. of water, after which the benzene is distilled at atmospheric pressure until half the original volume of the reaction mixture is left. This residue is filtered and the solids are washed with benzene. The combined filtrate and washings are then stripped of benzene at about 30 mm. of mercury pressure, after which the resulting residue is distilled through the Vigreux column to give 14.3 g. (51%) of a colorless liquid having a boiling point of 70° C. at 7.2 mm. Hg pressure and a refractive index of $n_D^{23.9}$ 1.4891.

EXAMPLE 4

Preparation of the cyclic formal of norbornane-2,7-diol

A one-liter, three-necked, round-bottom flask equipped with a mechanical stirrer and standard distillation apparatus is charged with 25.6 g. (0.2 m.) of the norbornane-2,7-diol (product of Example 1), 6.0 g. (0.2 m. $CH_2O$) of trioxymethylene, 400 ml. of methylene chloride and 1 g. of p-toluenesulfonic acid monohydrate as catalyst. The mixture is stirred and heated in a 50° C. oil bath with slow distillation of liquid. After two hours, about 100 ml. has been distilled. The reaction mixture is then stored for 15 hours, after which distillation is resumed until about 250 ml. of distillate is collected. The reaction mixture is stripped of solvent at about 30 mm. of mercury pressure and the residue is distilled to give 10.4 g. (37%) of colorless liquid, which boils at 50° C. at 2.7 mm. Hg pressure and has a refractive index of $n_D^{21.2}$ 1.4902.

EXAMPLE 5

Preparation of copolymers of trioxane and the formal of norbornane-2,7-diol

A 50-milliliter, round-bottom flask equipped with an agitator, a thermometer, a rubber serum injection cap and with nitrogen inlet and outlet tubes is heated in an oil bath at a temperature ranging from 52–60° C. and is flushed with nitrogen. Thirty-five and one tenth g. (1.17 mol $CH_2O$ equivalents) of molten trioxane, 7.79 grams (0.093 mol) of cyclohexane, 1.64 g. (0.0117 mol) of the formal of norbornane-2,7-diol and 0.018 g. (0.093 millimol) of boron trifluoride dibutyl etherate are then charged into the flask with agitation. The reaction mixture is maintained at about 56° to 62° C. under a slight positive nitrogen pressure for about 3 hours, after which the mixture is cooled and discharged from the flask. The polymeric solids are separated from the liquid medium and ground in a Waring Blendor containing methanol. The pulverulent product obtained is then washed successively with methanol, then with about 300 ml. of hot water containing a few drops of tributylamine and finally with methanol to remove any residual monomer, solvent and/or low molecular weight homopolymers. After washing, the product is dried under vacuum at about 60° C. There is recovered 27.0 grams (74% conversion) of a very white, polymeric material. This product contains 0.15 mol percent of units derived from the formal of norbornane-2,7-diol as determined by elemental chemical analysis. The copolymer has an inherent viscosity of 1.17, a melting point of about 161° C. and shows stability up to at least 250° C. The product of this example has a reaction rate constant for thermal degradation at 220° C. (under an inert nitrogen atmosphere) of 0.06 weight percent per minute, 86 percent of the copolymer remaining stable after the initial decomposition is completed. A portion of the copolymer is molded for 1 minute at a temperature of 190° C. under a pressure of 20,000 p.s.i. to prepare an extremely tough, white, opaque specimen molding which shows no evidence of thermal degradation.

EXAMPLE 6

A copolymer is prepared following the general procedure as outlined in Example 5, employing 35.2 g. (1.17 mol $CH_2O$ equivalents) of trioxane, 0.44 gram (0.0032 mol) of the formal of norbornane-2,7-diol, 7.79 g. (0.093 mol) of cyclohexane, 0.24 g. (0.062 millimol) of a 5% solution of boron trifluoride dibutyl etherate in cyclohexane. The reaction mixture is maintained at 57 to 60.5° C. (with the bath temp. being 54–60° C.) for two hours, after which the product is recovered in the manner as described in Example 5. The copolymer obtained (68% yield) contains 0.07 mol percent of units derived from the formal of norbornane-2,7-diol monomer. It has an inherent viscosity of 1.75 and a melting point of approximately 180° C. The polymer product has a reaction rate constant for thermal degradation at 220° C. of 0.12 percent per minute. When molded as described previously, the specimen moldings obtained from the copolymer show a high degree of thermal stability.

EXAMPLE 7

Again, a copolymer is prepared following essentially the procedure as outlined in Example 5, but employing constituents in varying amounts. In this run, 35.1 g. (1.17 mol $CH_2O$ equivalents) of molten trioxane, 7.79 g. (0.093 mol) of cyclohexane, 0.82 g. (0.0059 mol) of formal of norbornane-2,7-diol and 1.2 g. (0.062 millimol) of a 1% solution of boron trifluoride dibutyl etherate in cyclohexane. The reaction mixture is maintained at 54 to 60° C. for about 4 hours. The copolymer is obtained and treated as previously described resulting in a yield of 67%. A sample of the product obtained shows two peaks at 175° and 191° on the differential scanning calorimeter and after cooling and remelting, the material has a melting point of approximately 170° C. The product has an inherent viscosity of 1.64 and a reaction rate constant at 220° C. (run under $N_2$ atmosphere) of 0.06 weight percent per minute.

EXAMPLE 8

The copolymerization process of Example 5 is repeated with the equipment being charged with 7.79 g. (0.093 mol) of cyclohexane, 35.1 g. of molten trioxane, 0.82 g. (0.0059 mol) of formal of norbornane-2,7-diol and 1.5 g. (0.074 millimol) of a 1% solution of boron trifluoride dibutyl etherate in cyclohexane. The reaction mixture is maintained by 54 to 60° C. for three and one-half hours after which the product is recovered as previously described. The copolymer product, which is obtained in 81% yield, has an inherent viscosity of 1.42 and a melting point of approximately 180° C. The copolymer product of this example has a reaction rate constant for thermal degradation at 220° C. of 0.09 weight percent per minute. White, opaque specimen moldings prepared from the copolymer product are similar in appearance and properties to the molded products of the previous examples.

EXAMPLE 9

The flask used in Example 5 is charged with 7.79 g. (0.093 mol) of cyclohexane, 35.1 g. (1.17 mol $CH_2O$ equivalents) of molten trioxane, 1.64 g. (0.0117 mol) of formal of norborane-2,7-diol and 1.1 g. (0.079 mmol) of a 1% solution of boron trifluoride diethyl etherate in cyclohexane. The reaction is conducted at 57 to 60° C. for 3 hours, after which the product precipitate is isolated, purified and dried as previously described. The copolymer product, which is recovered in 62% yield, has an inherent viscosity of 1.14 and a melting point of approximately 179° C. This copolymer has a reaction rate constant for thermal degradation at 220° C. (under $N_2$ atmosphere) of 0.06 weight percent per minute. White, opaque specimen moldings prepared from the copolymer product are similar in appearance and properties to the molded products of the previous examples.

EXAMPLE 10

Preparation of prior art polyoxymethylene homopolymers

Following the general procedure as outlined in Example 5, an oxymethylene homopolymer is prepared, employing 35.2 g. (0.391 mol) of trioxane, 24.8 g. (0.282 mol) of cyclohexane and 0.01 g. (0.05 millimol) of boron trifluoride dibutyl etherate. The polymer recovered which has an inherent viscosity of 1.1 melts sharply at 177° C. When tested for thermal stability by thermogravimetric analysis, this polymer exhibits a reaction rate constant for thermal degradation at 220° C. ($k_{220}$) of 4.83 weight percent per minute during the first 30 minutes of the test period, and thereafter degrades at 1.5 percent per minute. The polymer sample completely decomposes and disappears about 60 minutes after the test has started. The homopolymer thus shows significantly poor stability by comparison to the copolymer products of the previous examples which exhibit a reaction rate constant for thermal degradation of significantly less than 0.2 weight percent per minute. When the homopolymer is molded under conditions as outlined in the previous examples, badly distorted dull pieces of opaque material are obtained. These pieces are brittle and appear somewhat porous in nature, as if partially formed by gaseous formaldehyde monomer evolved by decomposition of the polymer during heating.

It is to be understood that although the invention has been described with specific reference to particular embodiments thereof, it is not to be so limited since changes and alterations therein may be made which are well within the intended scope of the instant invention as defined by the appended claims.

What is claimed is:

1. As a novel composition of matter, a liquid cyclic formal compound with the structural formula:

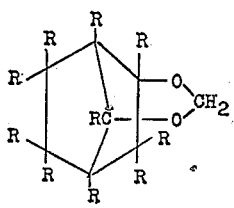

wherein each R is selected from the group consisting of hydrogen, lower alkyl and lower alkoxy radicals containing up to four carbon atoms, with no more than three R's being selected from the said lower alkyl and alkoxy radicals.

2. The cyclic formal of norbornane-2,7-diol.

3. A process for preparing the monomeric cyclic formal of a norbornane-2,7-diol which process comprises reacting together said norbornane-2,7-diol and trioxymethylene in the presence of an organic water-azeotroping solvent and, as catalyst, a compound selected from the group consisting of mineral acids and organic mineral acids, the resulting cyclic formal product being formed by the combination of one mole of the norbornane-2,7-diol with one mole of formaldehyde with the loss of one mole of water of condensation.

4. The process of claim 3 in which the norbornane-2,7-diol is unsubstituted norbornane-2,7-diol.

5. The process of claim 3 in which the said solvent is benzene.

6. The process of claim 3 in which the said solvent is methylene chloride.

7. The process of claim 3 in which the catalyst is p-toluenesulfonic acid monohydrate.

8. The process of claim 3 in which the catalyst is sulfuric acid.

9. The process of claim 3 which is carried out at a temperature ranging from 30° to 100° C. for a time period of from 2 to 6 hours.

10. A normally solid, thermoplastic copolymer having a high degree of thermal stability consisting essentially of from 95 to 99.9 percent of recurring oxymethylene units derived from trioxane and from 0.1 up to 5 percent of recurring units derived from the cyclic formal of a norbornane-2,7-diol with the general structural formula:

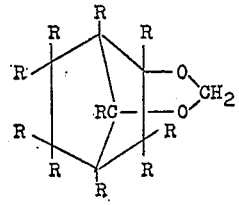

wherein each R is selected from the group consisting of hydrogen, lower alkyl and lower alkoxy radicals having up to four carbon atoms, with no more than three R's being selected from the said lower alkyl and alkoxy radicals.

11. The composition of claim 10 which has an inherent viscosity of at least 0.7, as determined at 60° C., employing a solution containing 0.5 g. of polymer per 100 milliliters of solution, the solvent being p-chlorophenol containing 2 percent of alpha-pinene, by weight.

12. The composition of claim 10 which has a reaction rate constant for thermal degradation at 220° C. of no more than 0.2 weight percent per minute.

13. A process for preparing a copolymer composition having a high degree of thermal stability which comprises reacting in an inert atmosphere under substantially anhydrous conditions and in the presence of a cationically-active polymerization catalyst, a mixture comprising as the major constituent, trioxane and as the minor constituent, a cyclic formal of a norbornane-2,7-diol which formal is of the structural formula:

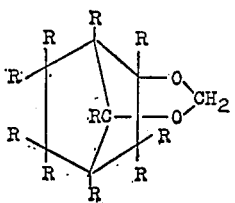

wherein each R is selected from the group consisting of hydrogen, lower alkyl and lower alkoxy radicals having up to four carbon atoms, with no more than three R's being selected from the said lower alkyl and alkoxy radicals; and recovering a solid copolymer containing from 95 up to 99.9 mol percent of oxymethylene units and from about 0.1 up to 5 mol percent of units derived from the said cyclic formal monomer.

14. The process of claim 13 in which the catalyst is selected from the group consisting of Lewis acids and coordination complexes of metal halides with organic compounds in which the donor atom is selected from the group consisting of oxygen, nitrogen and sulfur.

15. The process of claim 14 in which the catalyst is a boron trifluoride coordinate complex with an organic compound in which oxygen is the donor atom.

16. A process for preparing a copolymer composition having a high degree of thermal stability which comprises reacting in an inert atmosphere under substantially anhydrous conditions, at a temperature ranging from 30° to 100° C. and for a time period of from 1 to 20 hours, a major amount of trioxane and a minor amount of the formal of norbornane-2,7-diol in the presence of between 0.01 to about 5 millimols per mol of trioxane, of an ionic polymerization catalyst selected from the group consisting of Lewis acids and coordinate complexes of metal halides with organic compounds in which the donor atom is selected from the group consisting of oxygen, nitrogen and sulfur; and recovering a solid copolymer containing from about 95 up to 99.9 percent of recurring oxymethylene units and from 0.1 up to about 5 percent of recurring units derived from the said formal of norbornane-2,7- diol, the said copolymer composition having an average molecular weight of at least 6,000.

17. The process of claim 16 in which the reaction is conducted at a temperature ranging from 30° to 70° C. for a time period of 1 to 5 hours.

18. The process of claim 16 in which the catalyst is a boron trifluoride coordinate complex with an organic compound in which oxygen is the donor atom.

19. The process of claim 16 in which the catalyst is employed in an amount ranging between 0.03 to 0.5 millimol per mol of trioxane.

20. The process of claim 16 which is conducted in an inert, substantially anhydrous organic liquid reaction medium.

21. The process of claim 20 in which the organic liquid reaction medium is a cycloaliphatic hydrocarbon.

References Cited

UNITED STATES PATENTS 2,968,646  1/1961  Caldwell et al. -------- 260—67
3,256,246  6/1966  Gutweiler et al.

OTHER REFERENCES

Kwart et al.: Journal of American Chemical Society, vol. 76 (1954), pp. 5400–5403.

WILLIAM H. SHORT, *Primary Examiner.*

L. M. PHYNES, *Assistant Examiner.*

U.S. Cl. X.R.

260—340.3, 340.5

UNITED STATES PATENT OFFICE
CERTIFICATE OF CORRECTION

Patent No. 3,442,864  May 6, 1969

Thomas A. Magee

It is certified that error appears in the above identified patent and that said Letters Patent are hereby corrected as shown below:

In the heading to the printed specification, lines 4 and 5, "Diamond Alkali Company" should read -- Diamond Shamrock Corporation --.

Signed and sealed this 3rd day of March 1970.

(SEAL)
Attest:

Edward M. Fletcher, Jr.

Attesting Officer

WILLIAM E. SCHUYLER, JR.

Commissioner of Patents